(12) United States Patent
Minshull et al.

(10) Patent No.: US 12,132,438 B2
(45) Date of Patent: Oct. 29, 2024

(54) INDUCTION MOTOR CONTROL VIA GENERATOR CONTROL UNIT

(71) Applicant: Hamilton Sundstrand Corporation, Charlotte, NC (US)

(72) Inventors: Stephen Minshull, Bromsgrove (GB); Parminder Sangha, West Midlands (GB)

(73) Assignee: Hamilton Sundstrand Corporation, Charlotte, NC (US)

(*) Notice: Subject to any disclaimer, the term of this patent is extended or adjusted under 35 U.S.C. 154(b) by 164 days.

(21) Appl. No.: 17/941,709

(22) Filed: Sep. 9, 2022

(65) Prior Publication Data
US 2023/0108689 A1    Apr. 6, 2023

(30) Foreign Application Priority Data
Oct. 4, 2021  (EP) .................................... 21275143

(51) Int. Cl.
*H02P 27/06* (2006.01)
*F01D 7/00* (2006.01)
*F02C 6/00* (2006.01)
*H02P 9/00* (2006.01)
*H02P 9/08* (2006.01)
*H02P 101/25* (2016.01)
*H02P 101/30* (2015.01)

(52) U.S. Cl.
CPC .................. *H02P 9/08* (2013.01); *F01D 7/00* (2013.01); *F02C 6/00* (2013.01); *H02P 9/006* (2013.01); *H02P 2101/25* (2015.01); *H02P 2101/30* (2015.01)

(58) Field of Classification Search
CPC ........ H02P 9/08; H02P 9/006; H02P 2101/25; H02P 2101/30; H02P 9/00
See application file for complete search history.

(56) References Cited

U.S. PATENT DOCUMENTS

| | | |
|---|---|---|
| 8,421,398 B2 | 4/2013 | Fisher et al. |
| 10,202,178 B2 | 2/2019 | Himmelmann |
| 10,730,633 B2 | 8/2020 | Anghel et al. |
| 10,822,099 B2 | 11/2020 | Barone et al. |

(Continued)

FOREIGN PATENT DOCUMENTS

| | | |
|---|---|---|
| EP | 3406526 A2 | 11/2018 |
| EP | 3656998 A1 | 5/2020 |

OTHER PUBLICATIONS

Extended European Search Report for European Patent Application No. EP21275143.2, dated Mar. 31, 2022.

*Primary Examiner* — Muhammad S Islam

(57) ABSTRACT

A propulsion system (100) comprises: a generator (30) driven by a shaft (22) of a thermal engine (20) and configured to generate electrical power; an induction motor (60) that is electrically coupled to the output of the generator (30) and is configured to generate a rotational output in response to electrical power provided by the generator (30); a generator control unit (40) that is configured to control an output voltage of the generator (30) to limit a current supplied to the induction motor (60) during start-up of the propulsion system (100); and a switch (50) that is electrically coupled between the generator (30) and the induction motor (60), wherein the switch (50) is controllable by the generator control unit (40).

15 Claims, 3 Drawing Sheets

(56) References Cited

U.S. PATENT DOCUMENTS

| | | |
|---|---|---|
| 11,009,327 B2 | 5/2021 | Himmelmann |
| 2018/0265206 A1* | 9/2018 | Himmelmann ........ B64D 27/10 |
| 2023/0166856 A1* | 6/2023 | Hon ....................... B64D 27/24 |
| | | 701/3 |

* cited by examiner

INDUCTION MOTOR CONTROL VIA GENERATOR CONTROL UNIT

CROSS-REFERENCE TO RELATED APPLICATIONS

This application claims priority to and the benefit of European Patent Application No. EP21275143.2, filed Oct. 4, 2021, the entire content of which is incorporated herein by reference.

TECHNICAL FIELD

The present disclosure relates to an electric propulsion system, wherein a Direct-On-Line induction motor is powered by a generator.

BACKGROUND

Electric propulsion systems may be used as part of a hybrid-electric propulsion system to provide supplementary propulsion to a vehicle. In such electric propulsion systems, a propulsor is driven by an electric (e.g., induction) motor that is powered by a generator that is in turn powered by a thermal engine. This setup is beneficial as it allows the thermal engine to be isolated from the propulsors and electric motor meaning that both can operate in their optimal operating conditions.

When using a Direct-On-Line motor in such a system, the motor can be controlled using the control unit associated with the generator (e.g., by the control unit opening and closing a contactor between the motor and the generator). This offers the additional benefits of simplicity, reduced weight, increased reliability and increased efficiency when compared with architectures that require a separate motor controller function to drive the induction motor. However, there are some trade-offs with using this architecture. Firstly, it can produce a high inrush current into the induction motor when it is first connected to the generator. Also, whilst the generator's control unit can ensure a constant generator speed, the slip characteristic of an induction motor means that its speed will change with propulsor load and thus will not be constant during operation.

Therefore, it is desired to provide an improved system and method for use with a Direct-On-Line induction motor.

SUMMARY

According to an aspect of the present invention, there is a propulsion system comprising: a generator driven by a shaft of a thermal engine and configured to generate electrical power; an induction motor electrically coupled to the output of the generator and configured to generate a rotational output in response to electrical power provided by the generator; a generator control unit, 'GCU', configured to control an output voltage of the generator so as to limit a current supplied to the induction motor during start-up of the propulsion system; and a switch electrically coupled between the generator and the induction motor, wherein the switch is controllable by the GCU.

According to another aspect of the present invention, there is a method of operating a propulsion system, wherein the propulsion system comprises a generator configured to generate electrical power, an induction motor electrically coupled to the output of the generator, and a switch electrically coupled between the generator and the induction motor, the method comprising: limiting an input current of the induction motor during start-up of the propulsion system by either: (A) as the generator is accelerating: keeping the switch open; and keeping the output voltage of the generator at zero; and once the generator is at an operational speed: closing the switch; and gradually increasing the output voltage of the generator; or (B) keeping the switch closed; and controlling the output voltage of the generator in proportion to the speed of the generator as the generator accelerates.

The following optional features may be applied to either of the above aspects, which refer to the present invention as a system and subsequently a method (wherein the system and method may be claimed independently of each other). The GCU may be configured such that during start-up of the propulsion system:

as the generator is accelerating, the switch is kept open and the output voltage of the generator is kept at zero; and once the generator is at an operational speed, the switch is closed and the output voltage of the generator is gradually increased.

The GCU may be configured such that during start-up of the propulsion system, the switch is closed and the output voltage of the generator is controlled in proportion to the speed of the generator as the generator accelerates.

The propulsion system may further comprise a first connection between the rotational output of the induction motor and the GCU providing the GCU with a measured speed of the induction motor.

The GCU may be further configured to adjust the output voltage of the generator during operation by determining a current demand of the induction motor from comparing a desired speed of the induction motor with the measured speed of the induction motor.

The propulsion system may further comprise a second connection between the input of the induction motor and the GCU providing the GCU with a measured induction motor input current.

The GCU may be further configured to adjust the output voltage of the generator during operation by comparing the current demand of the induction motor with the measured induction motor input current.

The GCU may be further configured to monitor the measured induction motor input current and open the switch if the measured induction motor input current is above a threshold value.

The thermal engine may be a gas turbine engine. The propulsion system may further comprise a propulsor drivingly coupled to the rotational output of the induction motor. The propulsor may be a variable pitch propeller, and the GCU may be further configured to feather the propeller during start-up of the propulsion system.

The method may further comprise controlling the speed of the induction motor by: measuring a speed of the motor; comparing the speed of the motor with a desired speed of the motor; determining, based on the comparison, a current demand of the motor; and adjusting the output voltage of the generator to meet the current demand of the motor.

Controlling the speed of the induction motor may further comprise: measuring an input current into the induction motor; comparing the input current with the current demand; and adjusting the output voltage of the generator based on the comparison.

The method may further comprise monitoring the input current into the motor and opening the switch if the input current is above a threshold value.

Features of the systems, devices, and methods described herein may be used in various combinations, in accordance with the embodiments described herein.

BRIEF DESCRIPTION OF THE DRAWINGS

Various embodiments will now be described, by way of example only, and with reference to the accompanying drawings in which.

DETAILED DESCRIPTION

The present disclosure relates to a propulsion system comprising an induction motor that is powered directly by a generator driven by a thermal engine. The propulsion system disclosed herein may be applied to any situation in which it is desirable to mitigate against the high inrush currents and lack of speed control of such an architecture. For example, the propulsion system may be an aircraft propulsion system, and the thermal engine may be a gas turbine engine.

Figure 1:
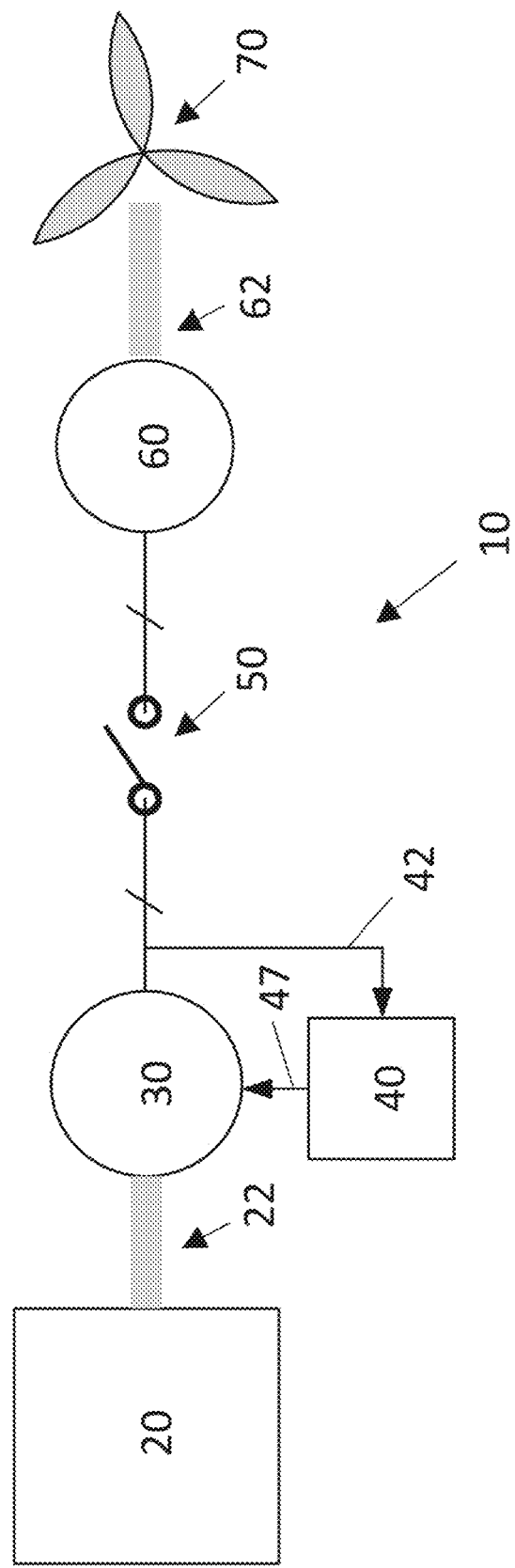
FIG. 1 shows an exemplary Direct-On-Line induction motor scheme in accordance with the prior art.

Referring to FIG. 1, the propulsion system 10 illustrates a prior art induction motor scheme. The propulsion system 10 comprises a thermal engine 20 including one or more rotatable shafts. The system 10 further comprises an electric generator 30 that is mechanically coupled to and driven by one of the shafts 22 of the thermal engine 20. The electric generator 30 is configured to convert the mechanical power produced by the shaft 22 of the thermal engine 20 into electric power. More specifically, the generator 30 comprises a rotor and a stator which comprise field windings and stator windings respectively. The rotor is configured to rotate within the stator. Field current is supplied to the field windings in order to magnetise the rotor. The rotation of this magnetised rotor generates an output current in the stator windings which can then be used to provide power. A generator control unit (GCU) 40 is electrically connected to the output of the generator 30 through connection 42 and controls the field current of the generator 30 through connection 47. By altering the field current, the GCU 40 can dictate the output voltage of the generator 30 and thus the power it outputs. The GCU 40 monitors the output voltage and current of the generator 30 in order to determine the field current required to produce a desired output power.

The output of the generator 30 is connected to an induction motor 60. The induction motor 60 converts the electrical energy provided by the generator 30 back into mechanical energy. More specifically, the induction motor 60 comprises a rotor and a stator, each comprising windings. The stator of the induction motor 60 creates a rotating magnetic field by passing an alternating current through its stator windings. This magnetic field is used to induce a current in the rotor windings, which in turn creates a separate magnetic field associated with the rotor. The magnetic field of the rotor then results in a rotation of the rotor as it interacts with the rotating magnetic field of the stator. Notably, the rotation of the rotor is always slightly slower than the rotation of the magnetic field of the stator, and the difference between these two rotational speeds is called slip.

The rotor 62 of the induction motor 60 provides a rotational output that is then used to drive a propulsor 70 (e.g., a propeller) to produce thrust. As such, the thrust produced by the propulsion system 10 is controlled by the GCU 40, as the output of the generator 30 (voltage and frequency) determines the rotational speed of the induction motor 60 and thus the propulsor 70.

One or more protection mechanisms 50 are provided between the generator 30 and the motor 60 to allow disconnection of the generator 30 from the motor 60 during normal or faulted operation. In the present embodiment, the protection mechanisms include a switch and may also include, e.g., a fuse.

One issue with the prior art propulsion system 10 as described above is that, once the desired output voltage of the generator 30 has been established and the switch 50 is then closed, connecting this output voltage to the induction motor 60, the motor 60 draws a high inrush current. This means that any electrical component or wiring used between the generator 30 and the motor 60 needs to be able to withstand this large current. Otherwise, this can result in electrical component stress and the activation of protection mechanisms, such as a fuse. The operational current of the motor 60 is significantly (e.g., ~4 to 10 times) lower than the inrush current experienced when the motor 60 is first connected to the generator 30 in this way. Therefore, if the inrush current is able to be limited, this would provide the benefits of reduced cost and weight as the electrical components and wiring used would not need to be able to withstand such large currents.

Furthermore, by controlling the thrust produced by the propulsion system 10 in this way (e.g. by having the GCU 40 monitor the output of the generator 30 and control it accordingly), control over the speed of the motor 60 may be limited. As mentioned above, induction motors have a slip characteristic. Due to this, the speed of the rotor 62 of the induction motor 60 is affected by the load imparted on it by the propulsor 70. Therefore, the GCU 40 cannot accurately control the speed of the motor 60 when monitoring only the output voltage of the generator 30, as above.

Figure 2:
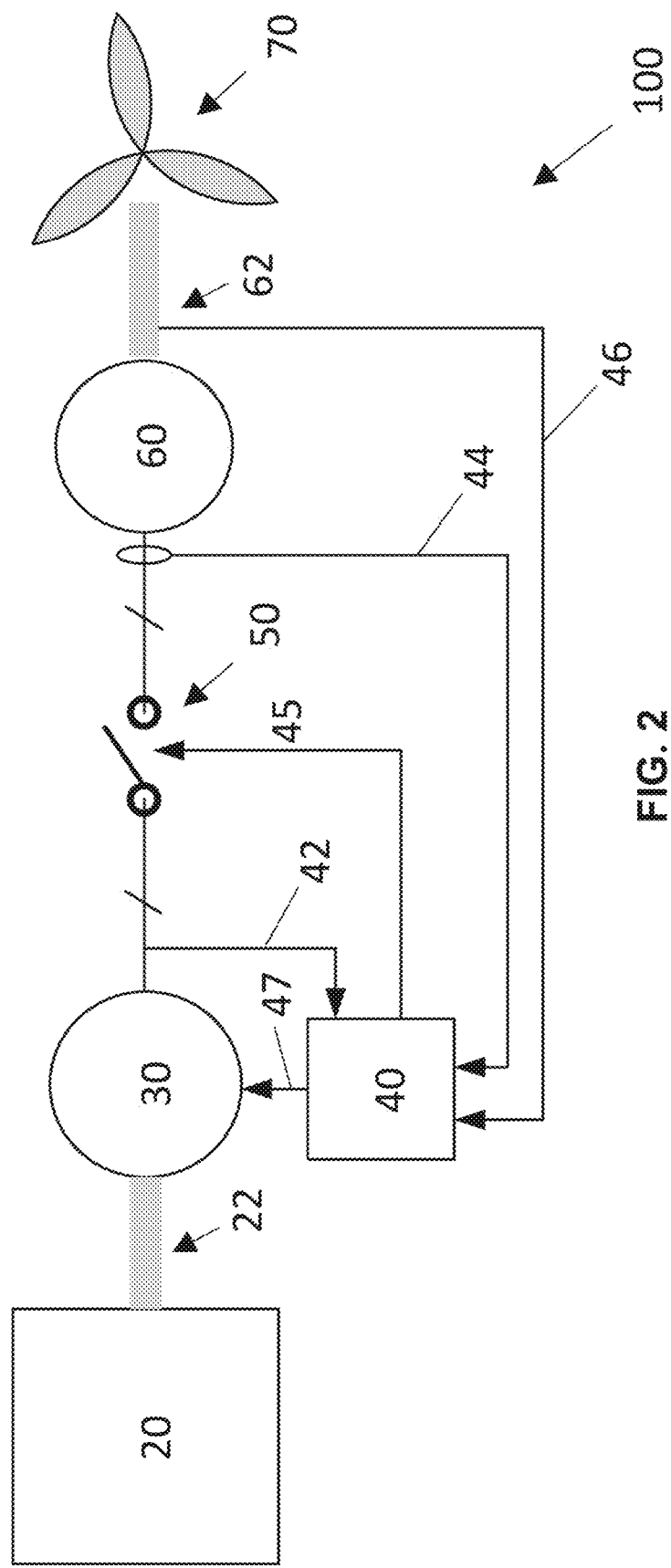
FIG. 2 shows an exemplary Direct-On-Line induction motor scheme in accordance with an embodiment of this disclosure.

In accordance with the present disclosure, the propulsion system 100 includes additional connections to the GCU 40. Such a propulsion system 100 is shown in FIG. 2, wherein like numerals denote like elements to those described above in reference to FIG. 1. Propulsion system 100 differs from propulsion system 10 in that it comprises additional inputs 44 and 46 into the GCU 40, and in that the GCU 40 is also able to control the switch 50 between the generator 30 and the motor 60 via connection 45. The inputs 44 and 46 provide feedback of the motor current and the motor speed, respectively, to the GCU 40. These three additional connections 44, 45, 46 allow the GCU 40 to: limit the inrush current into the induction motor 60; perform closed loop current and speed control; and monitor the induction motor currents for protection.

Regarding the function of limiting the inrush current, now that the GCU 40 is able to control the switch 50 between the generator 30 and motor 60 via connection 45, it can control the current supplied to the motor 60. Previously, the motor 60 would be directly connected to the generator 30 once its output voltage is already at its operational value, as the GCU 40 did not have the connections required to prevent this.

In one example, the switch 50 may be kept open during start-up of the system. As the thermal engine 20 accelerates the generator 30 up to its operational speed, the GCU 40 keeps the output voltage of the generator 30 at zero by controlling the field current. Once the generator 30 reaches its operational speed, the switch 50 can be closed by the GCU 40. As the current flowing between the generator 30 and the motor 60 is proportional to the output voltage of the generator 30 (due to Ohm's Law), the GCU 40 can control the current that flows into the motor 60 by increasing the output voltage of the generator 30 at a configurable rate whilst the motor 60 is accelerating.

Alternatively, the GCU 40 may close the switch 50 prior to starting the thermal engine 20. As the output voltage of the generator 30 increases with both the field current and the rotational frequency of its rotor, the GCU 40 can control the output voltage of the generator 30 by using a V/f method, as would be appreciated by those skilled in the art. This is achievable due to the GCU 40 having the connections 42 and 46 which feed back the output voltage of the generator 30 and the frequency of the motor 60. Again, this allows the GCU 40 to control the current provided to the motor 60 whilst the motor 60 is accelerating.

Optionally, in embodiments where the propulsor 70 is a variable pitch propeller, the GCU 40 may also be able to communicate with the propeller controller to set the propeller pitch to be in the feathered position during start-up. This reduces the low-speed load torque imparted on the motor 60 and so further reduces the current required for the motor 60 to accelerate up to its desired operating speed.

Regarding the function of closed loop speed control, now that the GCU 40 has the inputs 44 and 46, it can monitor the current supplied to the motor 60 and the speed of the motor 60 respectively. These inputs 44, 46 can be used to form the closed loop controllers shown in FIGS. 3a and 3b. It should be noted that the GCU 40 comprises other control mechanisms needed for stable operation of the generator 30, as per current state of the art, and that these closed loop controllers are used to augment the existing generator control function of the GCU 40 through providing small adjustments around the operating speed.

Figure 3A:
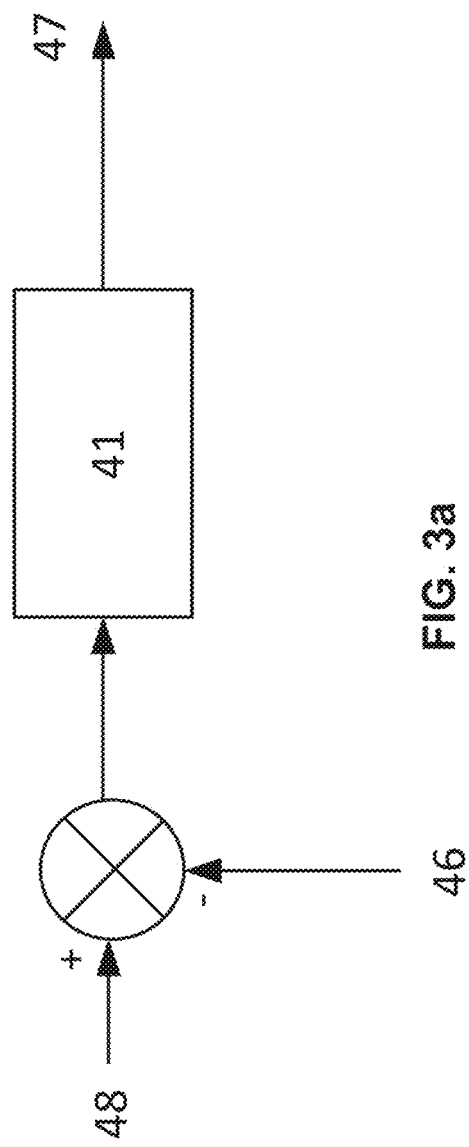
FIG. 3a shows an exemplary closed loop controller utilising in accordance with an embodiment of this disclosure.

In one embodiment, as shown in FIG. 3a, the GCU 40 comprises a first PI controller 41 which has the motor speed 46 and the desired motor speed 48 as inputs.

Subtracting these, the first controller 41 can calculate the motor speed error and determine the new current demand to the motor 60 to achieve the desired motor speed 48. From the new desired motor input current, the first controller can estimate a new desired output voltage for the generator 30 using Ohms law, and output a command signal to adjust the field current 47 accordingly.

Figure 3B:
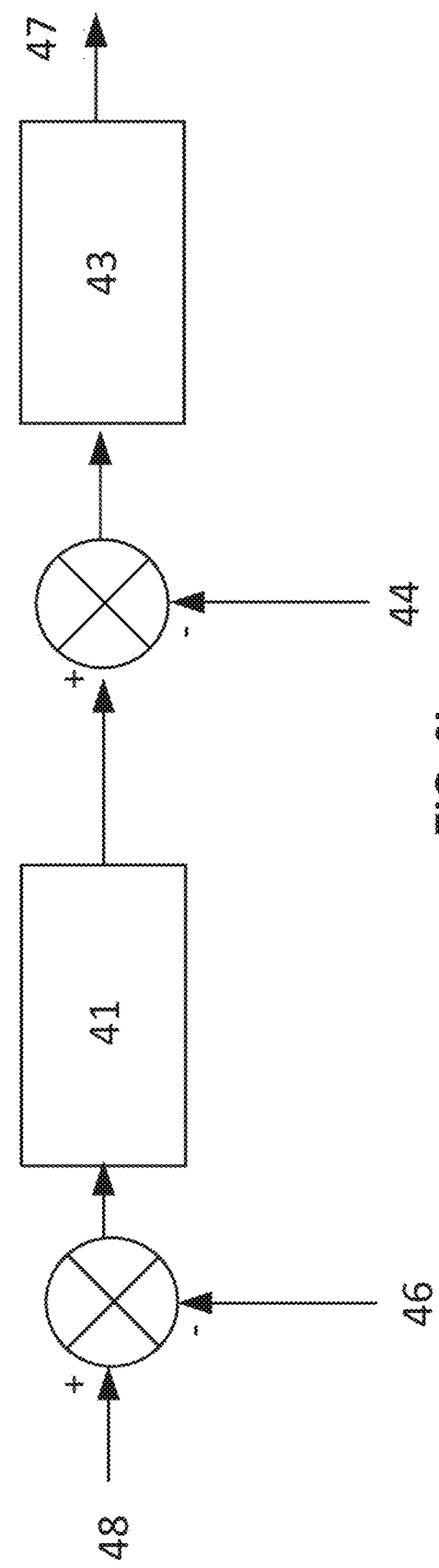
FIG. 3b shows an exemplary closed loop controller in accordance with an embodiment of this disclosure.

In another embodiment, as shown in FIG. 3b, the GCU 40 comprises a second PI controller 43 which has the output from the first controller 41 and the current 44 supplied to the motor 60 as inputs. In this instance, instead of estimating the required output voltage for the generator 30, the current 44 supplied to the motor 60 can be directly correlated to the field current 47 which provides more accurate control over the speed of the motor 60.

Regarding the function of monitoring the current of the induction motor 60 for protection, as the GCU 40 can control the switch 50 and knows the input current of the motor 60 through input 44, the GCU 40 can also be used to protect the motor 60. For example, if a current is detected that would be likely to damage the motor 60 or any auxiliary components, the switch 50 can be opened to isolate the motor 60 from the generator 30. Alternatively, the field current of the generator 30 can be controlled by the GCU 40 such that the output voltage of the generator 30 is set to zero.

The propulsion system 100 disclosed herein offers a solution to some of the potential disadvantages of series propulsion architectures using Direct-On-Line induction motors, namely high inrush currents and the lack of accurate speed control. By eliminating these disadvantages, this may allow for the advantages associated with the absence of a motor controller (reduced weight, improved efficiency and increased reliability) in these architectures to be realised. It may also improve the operational effectiveness of such architectures in propulsion applications.

The invention claimed is:

1. A propulsion system comprising:
a generator configured to be driven by a shaft of a thermal engine and generate electrical power;
an induction motor electrically coupled to an output of the generator and configured to generate a rotational output in response to the electrical power provided by the generator;
a generator control unit, ('GCU'), configured to control an output voltage of the generator so as to limit a current supplied to the induction motor during start-up of the propulsion system; and
a switch electrically coupled between the generator and the induction motor, wherein the switch is controllable by the GCU.

2. The propulsion system of claim 1, wherein the GCU is configured such that, during the start-up of the propulsion system:
as the generator is accelerating, the switch is kept open and the output voltage of the generator is kept at zero; and
once the generator is at an operational speed, the switch is closed and the output voltage of the generator is gradually increased.

3. The propulsion system of claim 1, wherein the GCU is configured such that, during the start-up of the propulsion system, the switch is closed and the output voltage of the generator is controlled in proportion to a speed of the generator as the generator accelerates.

4. The propulsion system of claim 1, further comprising a first connection between the rotational output of the induction motor and the GCU providing the GCU with a measured speed of the induction motor.

5. The propulsion system of claim 4, wherein the GCU is further configured to adjust the output voltage of the generator during operation by determining a current demand of the induction motor from comparing a desired speed of the induction motor with the measured speed of the induction motor.

6. The propulsion system of claim 5, further comprising a second connection between an input of the induction motor and the GCU providing the GCU with a measured induction motor input current.

7. The propulsion system of claim 6, wherein the GCU is further configured to adjust the output voltage of the generator during operation by comparing the current demand of the induction motor with the measured induction motor input current.

8. The propulsion system of claim 7, wherein the GCU is further configured to monitor the measured induction motor input current and open the switch if the measured induction motor input current is above a threshold value.

9. The propulsion system of claim 1, wherein the thermal engine is a gas turbine engine.

10. The propulsion system of claim 1, further comprising a propulsor drivingly coupled to the rotational output of the induction motor.

11. The propulsion system of claim 10, wherein the propulsor is a variable pitch propeller, and wherein the GCU is further configured to feather the propeller during the start-up of the propulsion system.

12. A method of operating a propulsion system, wherein the propulsion system comprises a generator configured to generate electrical power, an induction motor electrically coupled to an output of the generator, and a switch electrically coupled between the generator and the induction motor, the method comprising:
  limiting an input current of the induction motor during a start-up of the propulsion system by either:
    (A) as the generator is accelerating:
      keeping the switch open; and
      keeping an output voltage of the generator at zero; and
    once the generator is at an operational speed:
      closing the switch; and
      gradually increasing the output voltage of the generator; or
    (B) keeping the switch closed; and
      controlling the output voltage of the generator in proportion to a speed of the generator as the generator accelerates.

13. The method of claim 12, further comprising controlling a speed of the induction motor by:
  measuring the speed of the induction motor;
  comparing the speed of the induction motor with a desired speed of the induction motor;
  determining, based on the comparison, a current demand of the induction motor; and
  adjusting the output voltage of the generator to meet the current demand of the induction motor.

14. The method of claim 13, wherein controlling the speed of the induction motor further comprises:
  measuring an input current into the induction motor;
  comparing the input current with the current demand; and
  adjusting the output voltage of the generator based on the comparison.

15. The method of claim 12, further comprising monitoring an input current into the induction motor and opening the switch if the input current is above a threshold value.

* * * * *